Aug. 8, 1939.     J. GIARDINO     2,168,901
COVERED JOINT PISTON RING
Filed July 28, 1937
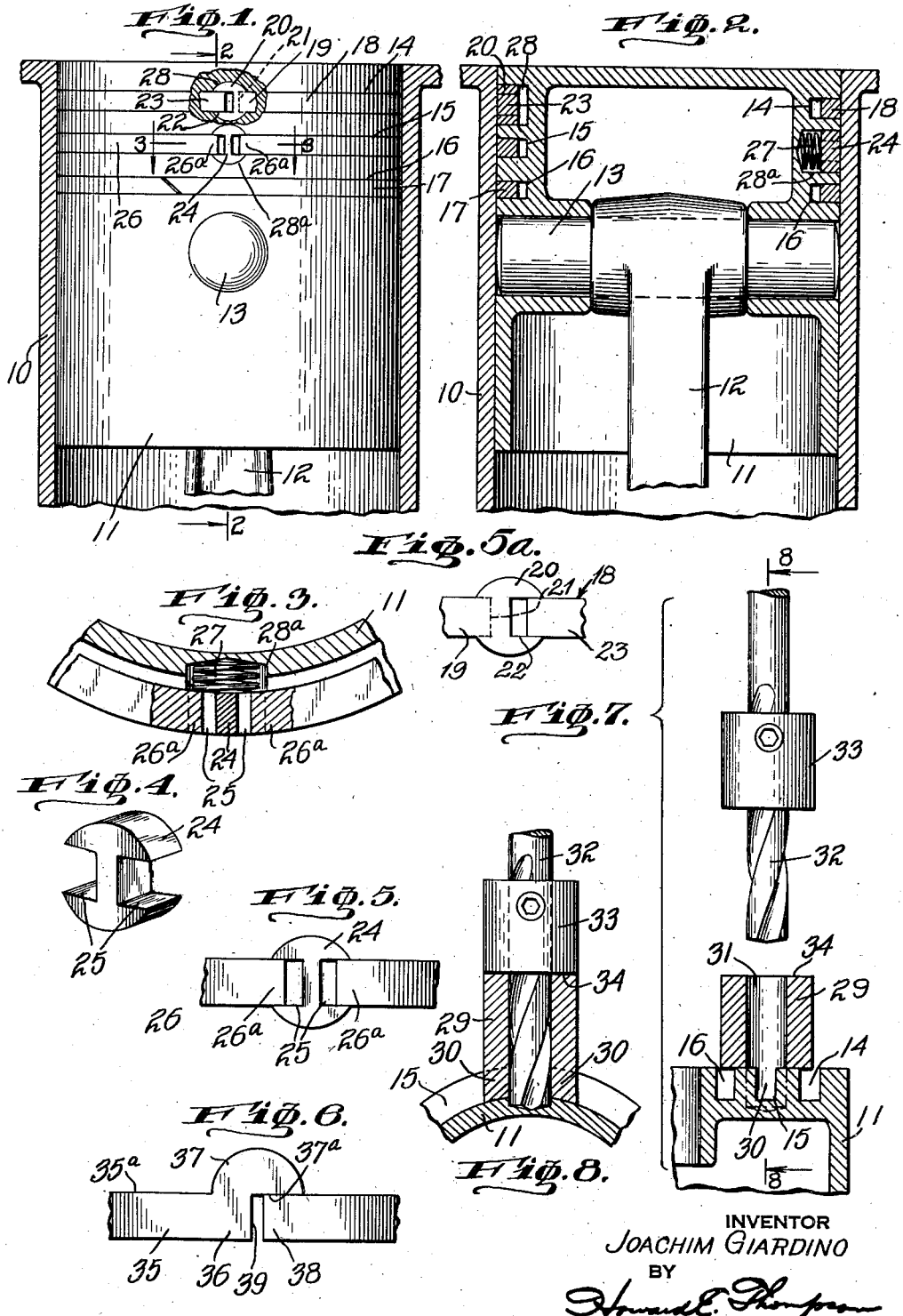
INVENTOR
JOACHIM GIARDINO
BY
ATTORNEY Patented Aug. 8, 1939

2,168,901

UNITED STATES PATENT OFFICE 2,168,901

COVERED JOINT PISTON RING

Joachim Giardino, West New York, N. J.

Application July 28, 1937, Serial No. 156,085

3 Claims. (Cl. 309—47)

This invention relates primarily to what is commonly known as piston rings or sealing devices used in ring grooves of a piston or plunger for effecting a seal, or substantial seal, of the piston or plunger in its movement in a cylinder, and especially to rings of the split type; and the object of the invention is to provide what I term a covered joint piston ring having means at the split section or area thereof, or at what may be termed the joint of the ring for producing a more perfect seal of the ring and prevent the customary blow-by usually prevailing at said joint; a further object being to provide a sealing means at the joint of the ring which will compensate for the wear on said ring, maintaining the seal throughout the life of the ring; a further object being to provide a sealing means of the class described in the form of a coupling which may constitute a part of one end of the ring or be independent thereof, and in connection with which the other end of the ring or both ends of the ring are relatively movable; a further object being to provide a sealing means or element of the class described arranged in an enlarged recess formed in the piston and which serves to key the ring against circumferential movement in the ring groove, and to definitely locate the joint of the ring at predetermined points on the piston, preferably in axial alinement with the wrist-pin of the piston; a still further object being to provide tensional means for supporting a free or independent sealing element in engagement with the cylinder wall, independent of the engagement of the piston ring therewith; and with these and other objects in view the invention consists in a ring and piston construction as more fully hereinafter described and claimed.

The invention is fully disclosed in the following specification, of which the accompanying drawing forms a part, in the separate parts of my improvement are designated by suitable reference characters in each of the views, in which:

Fig. 1 is a sectional view through a part of the cylinder diagrammatically illustrating one of my improved pistons therein, and showing two different forms of rings which I employ.

Fig. 2 is a partial section on the line 2—2 of Fig. 1.

Fig. 3 is a partial section on the line 3—3 of Fig. 1 on an enlarged scale.

Fig. 4 is a perspective view of one form of sealing element which I employ.

Fig. 5 is an enlarged detail view showing the element of Fig. 4 arranged upon the end portions of a piston ring.

Fig. 5a is a face view of a part of one of the rings shown in Fig. 1 on an enlarged scale.

Fig. 6 is a view similar to Fig. 5 showing a modification.

Fig. 7 is an exploded view diagrammatically illustrating the arrangement of tools and fixtures employed in forming my improved piston; and, Fig. 8 is a section on the line 8—8 of Fig. 7, showing the parts in a different position.

It is a well known fact that, in addition to the conventional wear upon a piston ring which causes the spreading of split or joint ends thereof resulting in the increase of the blow-by and the resulting power losses that conventional rings having overlapped portions, at the ends thereof, also develop additional blow-by by virtue of particles coming between adjacent surfaces of the overlapped split ends of the rings, which prevent the ring from assuming a true circular position bearing on the entire circumference of the cylinder. It is the primary object of my invention to so construct the ring as to eliminate these objectionable features and provide means for producing a more perfect seal at the split or joint portions of the ring thus maintaining longer life and producing more efficient service.

In Figs. 1 and 2 of the drawing, I have diagrammatically indicated at 10 a part of a cylinder, and at 11 I have shown one of my improved pistons supported upon a connecting rod 12 through a usual wrist-pin 13 and having a series of ring grooves 14, 15 and 16, the groove 16 being conventional in form and adapted to receive a conventional ring 17 of any preferred make or kind.

Arranged in the groove 14 is a split ring 18, to one end portion 19 of which is attached a sealing element 20, which is welded or otherwise secured to the said end 19. The element 20 is provided with a shallow recess 21 at one side thereof, into which the end 19 of the ring is placed. The other side of the element 20 is provided with a deeper recess 22 which receives the other end 23 of the ring and in which said end is free to slide, in compensating for the expansion and contraction of the ring and also the wear to which the ring is subjected. This construction is shown in detail in Fig. 5a of the drawing in which the end portions 19—23 of the ring 18 are shown, and it will be understood that in this construction the element 20 forms an integral part of the ring.

The element 20 is in the form of what might be termed an enlarged or recessed cylinder, substantially similar to the cylinder 24 shown in detail in Fig. 4 of the drawing, except for the arrangement of the recesses 21 and 22 in the element 20, the cylinder 24 having equal dimensional recesses 25 at opposite sides thereof. The cylinder 24 is shown supported upon a ring 26 arranged in the ring grooves 15 in Figs. 1 and 2 of the drawing. With this construction, the free ends 26a of the ring 26 are both free to move in the grooves or recesses 25, in the expansion and contraction of the ring 26 and in the wear thereof.

It will be apparent that the element 24 is free and independent of the ring ends 26a and, therefore, it is desirable to employ a spring 27 rearwardly of the element 24 to maintain the outer curved surfaces of said element in constant engagement with the cylinder wall.

Upon a consideration of Fig. 1 of the drawing, it will be seen that the diameter of the elements 20—24 is greater than the width of the ring grooves 14 and 16, and it is thus essential to provide large holes or recesses 28—28a in the piston to receive said elements 20—24, and this also serves to key and retain the rings in predetermined position, in the ring grooves. It will thus be seen that a special piston construction is essential in mounting my improved rings in the ring grooves, or at least conventional pistons will require repair to adapt them for the use of my rings.

In Figs. 7 and 8 of the drawing, I have illustrated a method of forming the holes or recesses 28—28a in the piston, which consists in providing a tubular fixture 29 adapted to seat upon the surface of the piston and having inwardly projecting key elements 30, which will extend into the ring grooves of the piston. For example, the groove 15, the sleeve 29 having a bore or passage to fit a drill 32 so as to guide the drill in the operation of drilling the holes 28—28a. It is also preferred that a stop collar 33 be fixed to the drill and to cooperate with the upper surface of the fixture 29 in limiting and regulating the depth of the holes 28—28a and, in this connection, it will be apparent that the hole 28 is drilled at less depth than the hole 28a, in that the use of the spring 27 is not essential with the ring structure 18.

In Fig. 6 of the drawing, I have shown another modification, wherein a split ring 35 is provided at one end portion 36 with an integral or integrally united element 37, which is preferably arranged upon the upper surface 35a of the ring and projects beyond the end 36 to overlap the end 38 of the ring or, in other words, to form a recess 39 below the lower surface 37a of the element 35, in which the end 38 of the ring is free to move in the expansion and contraction of the ring and in compensating for the wear thereof.

The structure shown in Fig. 6 will accomplish substantially the same result as the structure shown in the other figures, and it will appear that, by virtue of the semi-cylindrical contour of the element 37, a hole may be drilled in the piston but will be so alined and guided by a suitable fixture as to form a hole or recess in the piston to receive the element 37. This element 37 may be in the form of semi-cylindrical parts welded to the end 36 of the ring. It will, of course, be understood that the elements 20 and 37 will have their outer surfaces rounded or otherwise finished to a contour conforming with the contour of the cylinder in which the same are used.

It will also appear that other forms and arrangements of sealing elements may be provided, either in the form of elements free and independent of the end portions of the ring, or integral with or attached to one end of the ring. In all cases, however, in addition to forming the seal at the split or joint end of the ring, the sealing elements also provide means for keying the ring against circumferential movement in the ring grooves, that is to say, the split ends of the ring located upon predetermined wall structures of the piston. In this connection, it is preferred that these ends be located in alinement with the ends of the wrist-pin, or the axis thereof, especially in that these portions of the piston usually receive less wear than the portions thereof disposed at right angles to the wrist-pin. It is also preferred that the joint of one ring be arranged at one side of the piston and that of opposed ring at the other side thereof. Where more than two sealing rings are employed other modifications in the arrangement of the location of the split ends may be provided.

With my improved ring construction, it will appear that the split end portions of the rings are always maintained in alinement with the cylinder walls, especially in that no radially overlapping portions are provided on said split ends.

It will be apparent that while I have shown and described my improved rings as applied to a piston of an internal combustion engine, that the same may be used in conjunction with other mechanisms or apparatus, and for any purpose for which sealing devices of this kind and class are used, and especially where the means of a seal at the joint of the ring is a factor.

With my improved ring construction, it will appear that one or both side surfaces of the ring, that is to say, the upper and lower surfaces thereof is bridged at the joint or split of the ring by a sealing element, which either overlies both ends of the ring, or constitutes a part of one end of the ring, and overlies one or two side surfaces of the other end of the ring.

It will be understood that the illustrations in the accompanying drawing are all diagrammatic and do not represent the proportions and arrangements of parts as would be employed in practice, the illustrations being made primarily to show the general structural features of the invention. It will also appear that the several sealing elements form what might be termed a hood which covers the joint of the ring producing what might be termed a covered joint ring.

Having fully described my invention, what I claim as new and desire to secure by Letters Patent, is:

1. A sealing device of the class described comprising a split ring, the split in said ring forming relatively movable end portions, means on said end portions forming a bridging and sealing element between said relatively movable ends, preventing a blow-by across the outer surface of the ring where the ends thereof are separated, said means comprising a substantially cylindrical part of a thickness at least equal to the thickness of the ring ends with the outer surface of said cylindrical part substantially flush with the surfaces of the ring ends forming a bridge completely covering and spanning the spaced ends of the ring, and said cylindrical part being recessed at opposite sides and through inner, outer and side surfaces thereof to receive the ends of said split ring and to form a web extending from the front surface to the inner surface of said part.

2. A sealing device of the class described comprising a split ring, the split in said ring forming relatively movable end portions, means on said end portions forming a bridging and sealing element between said relatively movable ends, preventing a blow-by across the outer surface of the ring where the ends thereof are separated, said means comprising a substantially cylindrical part of a thickness at least equal to the thickness of the ring ends with the outer surface of said cylindrical part substantially flush with the surfaces of the ring ends forming a bridge completely covering and spanning the spaced ends of the ring, said cylindrical part being recessed at opposite sides and through inner, outer and side surfaces thereof to receive the ends of said split ring and to form a web extending from the front surface to the inner surface of said part, said ring ends being freely movable in said recesses, the outer surface of said cylindrical part being curved, and tensional means engaging the inner surface of said part to support the outer surface thereof in engagement with the surface over which the ring is moved.

3. A sealing device of the class described comprising a split ring, the split in said ring forming relatively movable end portions, means on said end portions forming a bridging and sealing element between said relatively movable ends, preventing a blow-by across the outer surface of the ring where the ends thereof are separated, said means comprising a substantially cylindrical part of a thickness at least equal to the thickness of the ring ends with the outer surface of said cylindrical part substantially flush with the surfaces of the ring ends forming a bridge completely covering and spanning the spaced ends of the ring, said cylindrical part being recessed at opposite sides and through inner, outer and side surfaces thereof to receive the ends of said split ring and to form a web extending from the front surface to the inner surface of said part, one of the recesses extending into said part a greater degree than the other and the ring end mounted in the last named recess being freely movable radially of said part within said recess in the expansion and contraction of the ring, and the other ring end being fixedly secured in the other recess of said part.

JOACHIM GIARDINO.